United States Patent
Zhou et al.

(10) Patent No.: US 7,095,448 B2
(45) Date of Patent: Aug. 22, 2006

(54) IMAGE PROCESSING CIRCUIT AND METHOD FOR MODIFYING A PIXEL VALUE

(75) Inventors: Qinggang Zhou, Chapel Hill, NC (US); Robert J. Gove, Los Gatos, CA (US)

(73) Assignee: Equator Technologies, Inc., Campbell, CA (US)

(*) Notice: Subject to any disclaimer, the term of this patent is extended or adjusted under 35 U.S.C. 154(b) by 957 days.

(21) Appl. No.: 09/750,382

(22) Filed: Dec. 21, 2000

(65) Prior Publication Data

US 2002/0001416 A1   Jan. 3, 2002

Related U.S. Application Data

(63) Continuation-in-part of application No. PCT/US99/14701, filed on Jun. 30, 1999.

(60) Provisional application No. 60/091,407, filed on Jul. 1, 1998.

(51) Int. Cl.
 *H04N 5/00* (2006.01)
 *G06F 15/00* (2006.01)

(52) U.S. Cl. ..................... 348/576; 358/3.19

(58) Field of Classification Search ............... 348/571, 348/576, 573; 382/275, 270; 358/1.9, 466, 358/463, 3.19
See application file for complete search history.

(56) References Cited

U.S. PATENT DOCUMENTS

| | | | | |
|---|---|---|---|---|
| 4,916,545 A | * | 4/1990 | Granger | 358/3.26 |
| 5,101,452 A | * | 3/1992 | Tsai et al. | 382/268 |
| 5,150,428 A | * | 9/1992 | Leone et al. | 382/270 |
| 5,394,250 A | | 2/1995 | Shono | |
| 5,436,736 A | * | 7/1995 | Shono | 358/3.19 |
| 5,457,477 A | * | 10/1995 | Wang et al. | 345/589 |
| 5,577,136 A | | 11/1996 | Tanioka et al. | |
| 5,689,588 A | * | 11/1997 | Rombola et al. | 382/237 |
| 5,825,509 A | | 10/1998 | Nomura | |
| 5,825,940 A | * | 10/1998 | Yamagata et al. | 382/276 |
| 5,884,011 A | * | 3/1999 | Shono | 358/1.6 |
| 5,900,862 A | | 5/1999 | Silverbrook et al. | |
| 6,028,677 A | * | 2/2000 | Keithley | 358/1.9 |
| 6,118,547 A | * | 9/2000 | Tanioka | 358/1.9 |
| 2001/0015816 A1 | * | 8/2001 | Metcalfe | 358/1.9 |

* cited by examiner

*Primary Examiner*—Paulos M. Natnael
(74) *Attorney, Agent, or Firm*—Marger Johnson & McCollom P.C.

(57) ABSTRACT

An image processing circuit compares a pixel value to a threshold value and modifies the pixel value if the pixel value has a predetermined relationship to the threshold value. Alternatively, the image processing circuit generates a random number and combines the random number with a pixel value. Such image processing circuits can be used to remove artifacts such as contour artifacts from a decoded electronic image or a sequence of decoded video frames.

63 Claims, 6 Drawing Sheets

IMAGE PROCESSING CIRCUIT AND METHOD FOR MODIFYING A PIXEL VALUE

This is a continuation-in-part of co-pending International Application PCT/US99/14701 filed on Jun. 30, 1999 designating the United States and also claims the benefit of U.S. Provisional Application No. 60/091,407, filed Jul. 1, 1998.

TECHNICAL FIELD

The invention relates generally to electronic and computer circuits, and relates more particularly to an image processing circuit and method for modifying a pixel value. For example, one can use such a circuit and method to remove contour artifacts from an electronic image that has undergone "lossy" compression.

BACKGROUND OF THE INVENTION

Undesirable visible artifacts such as contour artifacts are sometimes present in a decompressed electronic image. Quantization during the compression of the image often causes losses in image information; hence the term "lossy compression". Unfortunately, these losses may cause pixel-value errors during the decompression of the image, and these errors may cause visible artifacts in the decompressed image. Contour artifacts are line patterns that resemble the contour lines in a geographical map, and are typically more noticeable in the lower-intensity, i.e., darker, regions of the decompressed image than in the higher-intensity, i.e., brighter, regions of the image.

Unfortunately, some image-processing techniques such as gamma correction can increase the visibility of artifacts such as contour artifacts. Generally, gamma correction increases the contrast in the bright regions of an image relative to the contrast in the dark regions of the image. That is, brightness changes in the bright regions are amplified with respect to brightness changes in the dark regions. For example, a brightness change of 1 lumen in a bright region may be gamma corrected to 1.5 lumens, but a brightness change of 1 lumen in a dark region may be unchanged or gamma corrected to less than 1.5 lumens. The actual gamma-correction algorithm used depends on variables such as the characteristics of the image display device. Image processing circuits use gamma correction to compensate for the human eye's non-linear brightness response. The human eye is more sensitive to brightness changes in dark image regions than it is to brightness changes in bright image regions. That is, the human eye perceives a change of 1 lumen in a dark region as being a larger change than a change of 1 lumen in a bright region. Therefore, gamma correction allows the human eye to perceive a linear or nearly linear contrast scale across the entire brightness range of an image. But unfortunately, gamma correction often effectively increases the quantization levels in the dark regions relative to the quantization levels in the bright regions, and thus may increase the visibility of existing contour artifacts.

Overview of Image-Compression/Decompression Techniques

To help the reader understand the concepts discussed above and the concepts discussed below in the Description of the Invention, following is a basic overview of image-compression/decompression.

To electronically transmit a relatively high-resolution image over a relatively low-band-width channel, or to electronically store such an image in a relatively small memory space, it is often necessary to compress the digital data that represents the image. For example, High Definition Television (HDTV) video images are compressed to allow their transmission over existing television channels. Without compression, HDTV video images would require transmission channels having bandwidths much greater than the bandwidths of existing television channels. Furthermore, to reduce data traffic and transmission time to acceptable levels, an image may be compressed before being sent over the internet. Or, to increase the image-storage capacity of a CD-ROM or computer server, an image may be compressed before being stored thereon.

Such image compression typically involves reducing the number of data bits necessary to represent an image. Unfortunately, many compression techniques are lossy. That is, visual information contained in the original image may be lost during compression. As stated above, this loss of information may cause noticeable differences, often called visual artifacts, in the decompressed image. In many cases, these artifacts are undesirable, and thus significantly reduce the visual quality of the decompressed image as compared to the visual quality of the original image.

Referring to FIGS. 1–3, the basics of the popular block-based Moving Pictures Experts Group (MPEG) compression standards, which include MPEG-1 and MPEG-2, are discussed. For purposes of illustration, this discussion is based on using an MPEG 4:2:0 format to compress images represented in a Y, $C_B$, $C_R$ color space. But the basic concepts discussed also apply to other MPEG formats, images represented in other color spaces, and to other block-based compression standards such as the Joint Photographic Experts Group (JPEG) standard, which is often used to compress still images. Furthermore, although many details of the MPEG standards and the Y, $C_B$, $C_R$ color space are omitted for brevity, these details are well-known and are disclosed in a large number of available references.

Referring to FIGS. 1–3, the MPEG standards are often used to compress temporal sequences of images, i.e., video frames, such as found in a television broadcast. Each video frame is divided into regions called macro blocks, that each include one or more pixels. FIG. 1A is a 16-pixel-by-16-pixel macro block 10 having 256 pixels 12. In the MPEG standards, a macro block is always 16×16 pixels, although other compression standards may use macro blocks having other dimensions. In the original video frame, each pixel 12 has a respective luminance value Y and a respective pair of color-, i.e., chroma-, difference values $C_B$ and $C_R$.

Referring to FIGS. 1A–1D, before compression of the frame, the digital luminance (Y) and chroma-difference ($C_B$ and $C_R$) values that will be used for compression, i.e., the pre-compression values, are generated from the original Y, $C_B$, and $C_R$ values of the original frame. In the MPEG 4:2:0 format, the pre-compression Y values are the same as the original Y values. Thus, each pixel 12 merely retains its original luminance value Y. But to reduce the amount of data to be compressed, the MPEG 4:2:0 format allows only one pre-compression $C_B$ value and one pre-compression $C_R$ value for each group 14 of four pixels 12. Each of these pre-compression $C_B$ and $C_R$ values are respectively derived from the original $C_B$ and $C_R$ values of the four pixels 12 in the respective group 14. For example, one can set a pre-compression $C_B$ value equal to the average of the original $C_B$ values for the four pixels 12 in a respective group 14. Thus, referring to FIGS. 1B–1D, the pre-compression Y, $C_B$, and $C_R$ values generated for the macro block 10 are arranged as one 16×16 matrix 17 of pre-compression Y values (equal to the original Y value for each pixel 12), one 8×8 matrix 18 of pre-compression $C_B$ values (equal to one derived $C_B$ value for each group 14 of four pixels 12), and one 8×8 matrix 20 of pre-compression $C_R$ values (equal to one derived $C_R$ value for each group 14 of four pixels 12). It is, however, common in the industry to call the matrices 18 and 20 and the 8×8 quadrants of the matrix 17 "blocks" of values. Furthermore, because it is convenient to perform the compression transforms on 8×8 blocks of pixel values instead of on 16×16 blocks, the macro block 17 of pre-compression Y values is subdivided into four 8×8 blocks 22a–22d, which respectively correspond to the 8×8 blocks A–D of pixels 12 in the macro block 10. Thus, still referring to FIGS. 1B–1D, six 8×8 blocks of pre-compression pixel values are generated for each macro block 10: four 8×8 blocks 22a–22d of pre-compression Y values, one 8×8 block 18 of pre-compression $C_B$ values, and one 8×8 block 20 of pre-compression $C_R$ values.

FIG. 2 is a general block diagram of an MPEG compressor 30, which is more commonly called an encoder 30. Generally, the encoder 30 converts the pre-compression data for a frame or sequence of frames into encoded data that represent the same frame or frames with significantly fewer data bits than the pre-compression data. To perform this conversion, the encoder 30 reduces or eliminates redundancies in the pre-compression data and reformats the remaining data using efficient transform and coding techniques.

More specifically, the encoder 30 includes a frame-reorder buffer 32, which receives the pre-compression data for a sequence of one or more frames and reorders the frames in an appropriate sequence for encoding. Thus, the reordered sequence is often different than the sequence in which the frames are generated or will be displayed. The encoder 30 assigns each of the stored frames to a respective group, called a Group Of Pictures (GOP), and labels each frame as either an intra (I) frame or a non-intra (non-I) frame. For example, each GOP may include three I frames and twelve non-I frames for a total of fifteen frames. The encoder 30 always encodes an I frame without reference to another frame, but can and often does encode a non-I frame with reference to one or more of the other frames in the GOP. The encoder 30 does not, however, encode a non-I frame with reference to a frame in a different GOP.

Referring to FIGS. 1 and 2, during the encoding of an I frame, the 8×8 blocks (FIGS. 1B–1D) of the pre-compression Y, $C_B$, and $C_R$ values that represent the I frame pass through a summer 34 to a Discrete Cosine Transformer (DCT) 36, which transforms these blocks of values into respective 8×8 blocks of one DC (zero frequency) coefficient and sixty-three AC (non-zero frequency) coefficients. That is, the summer 34 is not needed when the encoder 30 encodes an I frame, and thus the pre-compression values pass through the summer 34 without being summed with any other values. (As discussed below, however, the summer 34 is often needed when the encoder 30 encodes a non-I frame.) A quantizer 38 limits each of the coefficients to a respective quantization value and provides the quantized AC and DC coefficients on paths 40 and 42, respectively. A prediction encoder 44 predictively encodes the DC coefficients, and a variable-length coder 46 converts the quantized AC coefficients and the quantized and predictively encoded DC coefficients into variable-length code words, such as Huffman code words. These code words compose the encoded data that represent the pixel values of the encoded I frame. A transmit buffer 48 then temporarily stores these codes to allow synchronized transmission of the encoded data to a decoder (discussed below in conjunction with FIG. 3). Alternatively, if the encoded data is to be stored instead of transmitted, the coder 46 may provide the variable-length code words directly to a storage medium such as a CD-ROM.

If the I frame will be used as a reference (as it often will be) for one or more non-I frames in the GOP, then, for the following reasons, the encoder 30 generates a corresponding reference frame by decoding the encoded I frame with a decoding technique that is similar or identical to the decoding technique used by the decoder (FIG. 3). When decoding non-I frames that are referenced to the I frame, the decoder has no option but to use the decoded I frame as a reference frame. Because MPEG encoding is lossy—some information is lost due to the quantization of the AC and DC DCT coefficients—the pixel values of the decoded I frame will often be different than the pre-compression pixel values of the original I frame. Therefore, using the pre-compression I frame as a reference frame during encoding may cause additional artifacts in the decoded non-I frame because the reference frame used for decoding (decoded I frame) would be different than the reference frame used for encoding (pre-compression I frame).

Therefore, to generate a reference frame for the encoder 30 that will be similar to or the same as the reference frame for the decoder (FIG. 3), the encoder includes a dequantizer 50 and an inverse DCT 52, which are designed to mimic the dequantizer and inverse DCT of the decoder. The dequantizer 50 dequantizes the quantized DCT coefficients from the quantizer 38, and the inverse DCT 52 transforms these dequantized DCT coefficients into corresponding 8×8 blocks of Y, $C_B$, and $C_R$ pixel values, which together compose the reference frame. Because of the losses incurred during quantization, however, some or all of these decoded pixel values may be different than their corresponding pre-compression pixel values, and thus the reference frame may be different than its corresponding pre-compression frame as discussed above. These decoded pixel values then pass through a summer 54—used when generating a reference frame from a non-I frame as discussed below—to a reference-frame buffer 56, which stores the reference frame.

During the encoding of a non-I frame, the encoder 30 initially encodes each macro-block of the non-I frame in at least two ways: in the manner discussed above for I frames, and using motion prediction, which is discussed below. The encoder 30 then saves and transmits the resulting code having the fewest bits. Thus, this technique insures that the macro blocks of the non-I frames are encoded using the fewest bits.

With respect to motion prediction, an object in a frame exhibits motion if its relative position changes in the preceding or succeeding frames. For example, a horse exhibits relative motion if it gallops across the screen. Or, if the camera follows the horse, then the background exhibits relative motion with respect to the horse. Generally, each of the succeeding frames in which the object appears contains at least some of the same macro blocks as the preceding frames. But such matching macro blocks in a succeeding frame often occupy respective frame locations that are different than the respective frame locations they occupy in the preceding frames. Alternatively, a macro block that includes a portion of a stationary object (e.g., tree) or background scene (e.g., sky) may occupy the same frame location in each of the successive frames, and thus exhibit zero motion. In either case, instead of encoding each frame independently, it often takes fewer data bits to tell the decoder "the macro blocks R and Z of frame 1 (non-I frame) are the same as (or similar to) the macro blocks that are in the locations S and T, respectively, of frame 0 (reference frame)." "(Frames 0 and 1 and macro blocks R, S, T, and Z not shown)." This "statement" is encoded as respective motion vectors (one pointing from R to S, another pointing from T to Z) having respective locations values that indicate the relative movements of the respective macro blocks from one frame to another. For a relatively fast-moving object, the relative movements, and thus the location values, are relatively large. Conversely, for a stationary or relatively slow-moving object or background scene, the relative movements, and thus the location values, are relatively small or equal to zero.

Still referring to FIG. 2, during the encoding of a non-I frame, a motion predictor 58 compares the pre-compression Y values—the $C_B$ and $C_R$ are not used during motion prediction—of the macro blocks in the non-I frame to the decoded Y values of the macro blocks in the reference I frame and identifies matching macro blocks. For each macro block in the non-I frame for which a match is found in the I reference frame, the motion predictor 58 generates a motion vector that identifies the reference frame and the location of the matching macro block within the reference frame. Thus, as discussed below in conjunction with FIG. 3, during decoding of these motion-encoded macro blocks of the non-I frame, the decoder uses the motion vectors to obtain the pixel values of the motion-encoded macro blocks from the matching macro blocks in the reference frame. The prediction encoder 44 predictively encodes the motion vectors, and the coder 46 generates respective code words for the encoded motion vectors and provides these code words to the transmit buffer 48.

Furthermore, because a macro block in the non-I frame and a matching macro block in the reference I frame are often similar but not identical, the encoder 30 encodes these differences along with the motion vector so that the decoder can account for them. More specifically, the motion predictor 58 provides the decoded Y values of the matching macro block in the reference frame to the summer 34, which effectively subtracts, on a pixel-by-pixel basis, these Y values from the pre-compression Y values of the non-I macro block being encoded. These differences, which are called residuals, are arranged in 8×8 blocks and are processed by the DCT 36, the quantizer 38, the coder 46, and the buffer 48 in a manner similar to that discussed above, except that the quantized DC coefficients of the residual blocks are coupled directly to the coder 46 via the line 40, and thus are not predictively encoded by the prediction encoder 44.

In addition, it is possible to use a non-I frame as a reference frame. When a non-I frame will be used as a reference frame, the quantized residuals from the quantizer 38 are respectively dequantized and inverse transformed by the dequantizer 50 and inverse DCT 52, respectively, so that this non-I reference frame will be the same as the one used by the decoder for the reasons discussed above. The motion predictor 58 provides to the summer 54 the decoded Y values of the reference frame from which the residuals were generated. The summer 54 adds the respective residuals from the inverse DCT 52 to these decoded Y values of the reference frame to generate the respective Y values of the non-I reference frame. The reference-frame buffer 56 then stores the reference non-I frame along with the reference I frame for use in motion encoding subsequent non-I frames.

Still referring to FIG. 2, the encoder 30 also includes a rate controller 60 to ensure that the transmit buffer 48, which typically transmits the encoded frame data at a fixed rate, never overflows or empties, i.e., underflows. If either of these conditions occur, errors may be introduced into the encoded data stream. For example, if the buffer 48 overflows, data from the coder 46 is lost. Thus, the rate controller 60 uses feedback to adjust the quantization scaling factors used by the quantizer 38 based upon the degree of fullness of the transmit buffer 48. Specifically, the fuller the buffer 48, the larger the controller 60 makes the scaling factors, and thus the fewer data bits the coder 46 generates. Conversely, the more empty the buffer 48, the smaller the controller 60 makes the scaling factors, and thus the more data bits the coder 46 generates. This continuous adjustment ensures that the buffer 48 neither overflows nor underflows.

FIG. 3 is a block diagram of a conventional MPEG decompresser 60, which is more commonly called a decoder and which can decode frames that are encoded by the encoder 30 of FIG. 2.

For I-frames and macro blocks of non-I frames that are not motion predicted, a variable-length coder 62 decodes the variable-length code words received from the encoder 30 (FIG. 2). A prediction decoder 64 decodes the predictively decoded DC coefficients, and a dequantizer 65, which is similar or identical to the dequantizer 50 of FIG. 2, dequantizes the decoded AC and DC coefficients. An inverse DCT circuit 66, which is similar or identical to the inverse DCT 52 of FIG. 2, transforms the dequantized coefficients into pixel values. The decoded pixel values pass through a summer 68 (which is used during the decoding of motion-predicted macro blocks of non-I frame as discussed below) into a frame-reorder buffer 70, which stores the decoded frames and arranges them in a proper order for display on a video display unit 72. If the decoded I-frame is used as a reference frame, it is also stored in the reference-frame buffer 74.

For motion-predicted macro blocks of non-I frames, the decoder 62, dequantizer 65, and inverse DCT 68 process the residual coefficients as discussed above for the coefficients of the I-frames. In addition, the prediction encoder 64 decodes the motion vectors, and a motion interpolator 76 provides to the summer 68 the pixel values from the reference-frame macro blocks to which the motion vectors point. The summer 68 adds these pointed-to pixel values to the residual pixel values to generate the pixel values of the decoded macro blocks, and provides these decoded pixel values to the frame-reorder buffer 70. If the encoder 30 (FIG. 2) uses the decoded non-I frame as a reference frame, then this decoded non-I frame is stored in the reference-frame buffer 74.

Referring to FIGS. 2 and 3, although described as including multiple functional circuit blocks, the encoder 30 and the decoder 60 may be implemented in hardware, software, or a combination of both. For example, the encoder 30 and the decoder 60 are often implemented by respective processors that perform the functions of the respective circuit blocks.

More detailed discussions of the MPEG encoder 30 and the MPEG decoder 60 of FIGS. 2 and 3, respectively, and of the MPEG standard in general are available in many publications including, "Video Compression" by Peter D. Symes, McGraw Hill, 1998, which is incorporated by reference. Furthermore, other well-known block-based compression techniques are available for encoding and decoding video and still images.

SUMMARY OF THE INVENTION

In one aspect of the invention, an image processing circuit compares a pixel value to a threshold value and modifies the pixel value if the pixel value has a predetermined relationship to the threshold value.

In another aspect of the invention, an image processing circuit generates a random number and combines the random number with a pixel value.

Such image processing circuits can be used to remove artifacts such as contour artifacts from a decoded electronic image.

DETAILED DESCRIPTION OF THE INVENTION

Figure 1:
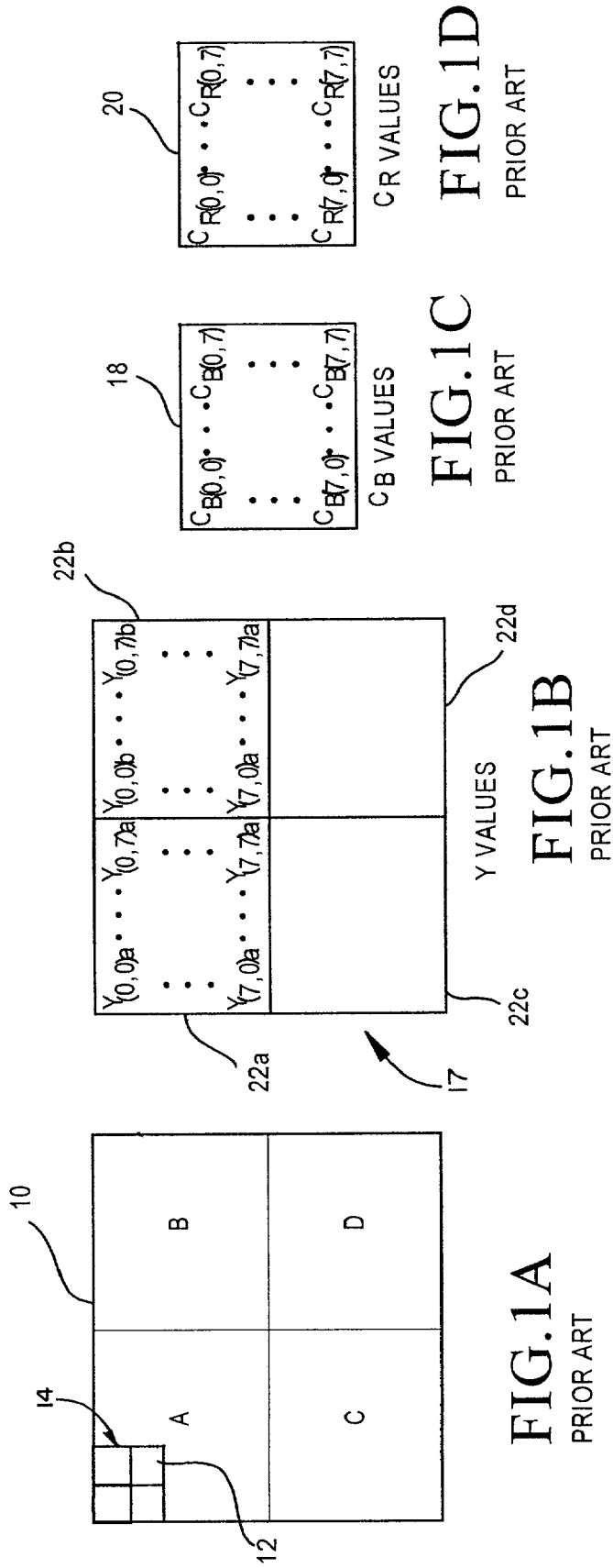
FIG. 1A is a conventional macro block of pixels.
FIG. 1B is a conventional block of pre-compression Y values that respectively correspond to the pixels in the macro block of FIG. 1A.
FIG. 1C is a conventional block of pre-compression $C_B$ values that respectively correspond to the pixel groups in the macro block of FIG. 1A.
FIG. 1D is a conventional block of pre-compression $C_R$ values that respectively correspond to the pixel groups in the macro block of FIG. 1A.
Figure 2:
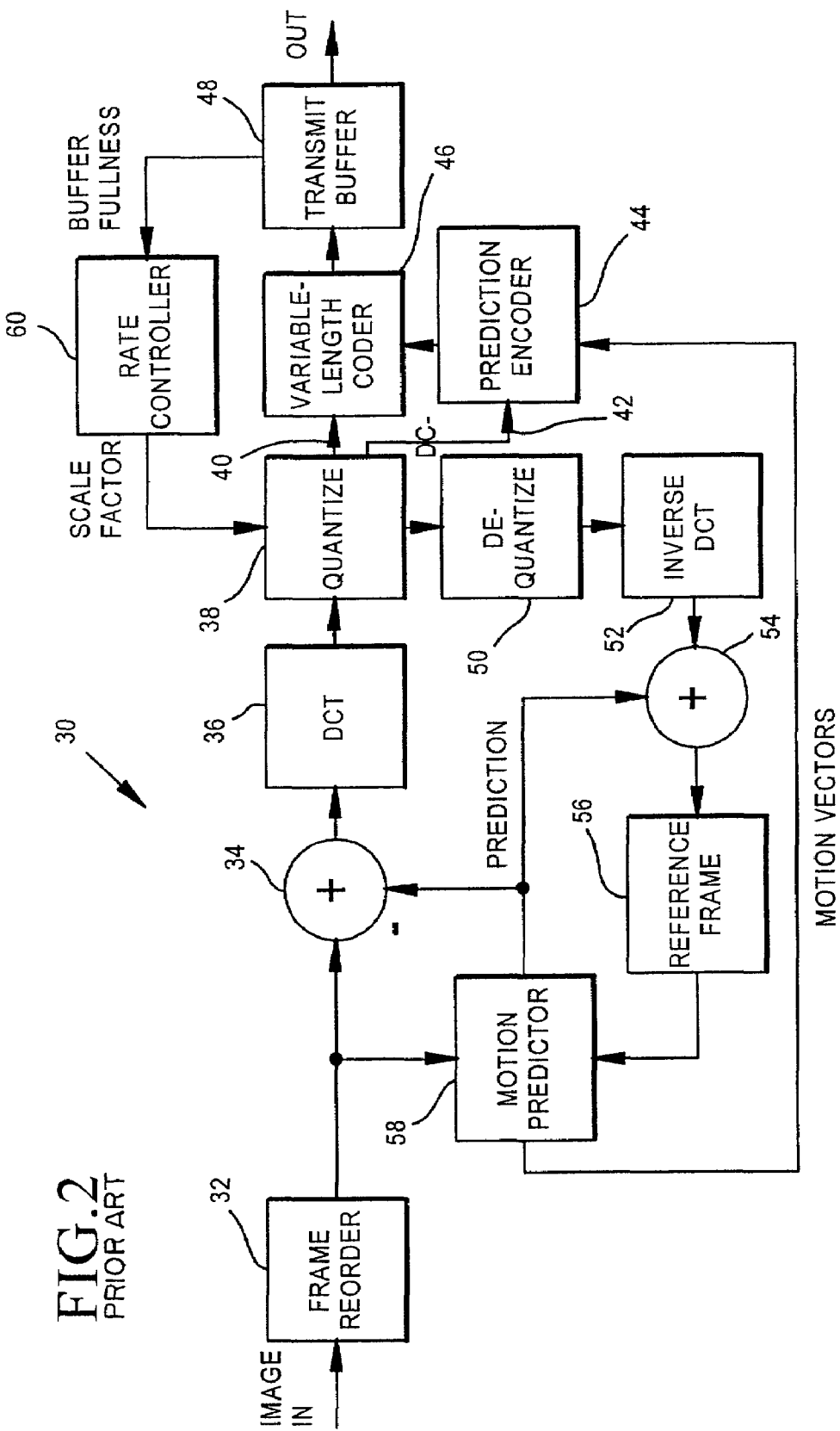
FIG. 2 is a block diagram of a conventional MPEG encoder.
Figure 3:
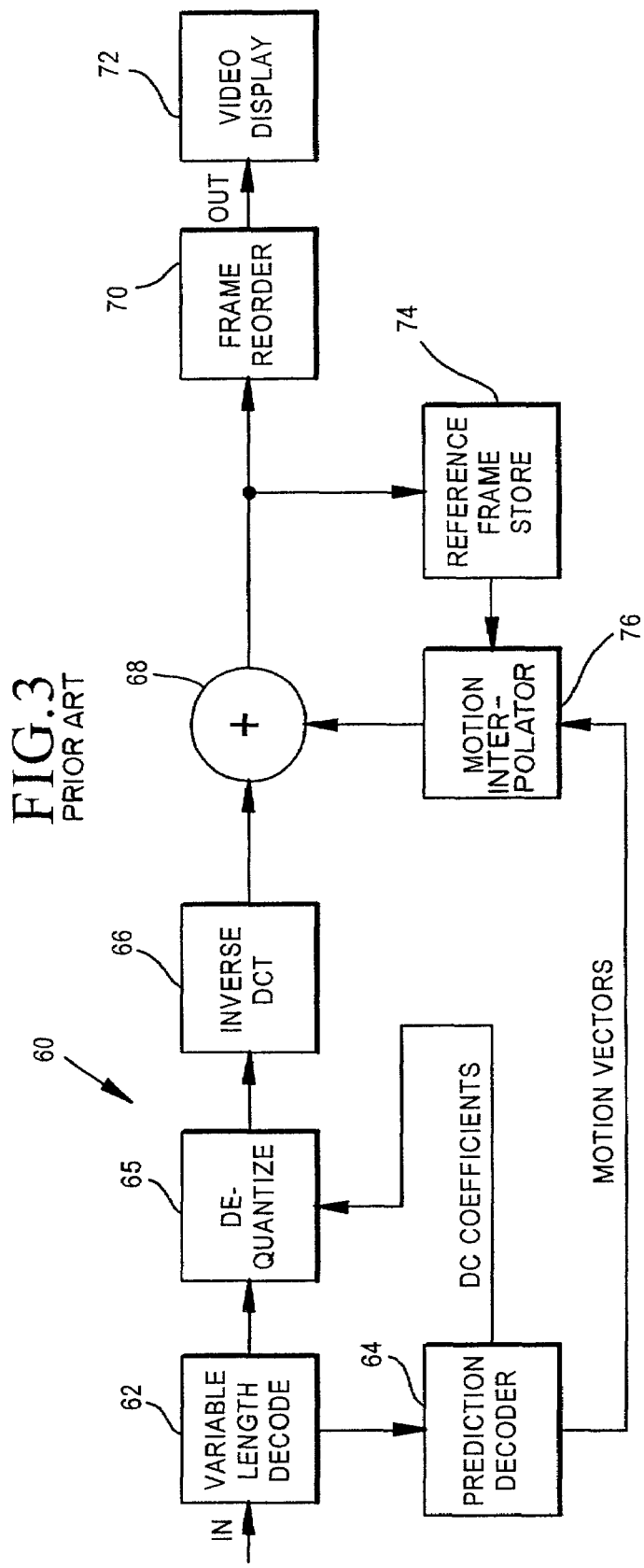
FIG. 3 is a block diagram of a conventional MPEG decoder.
Figure 4:
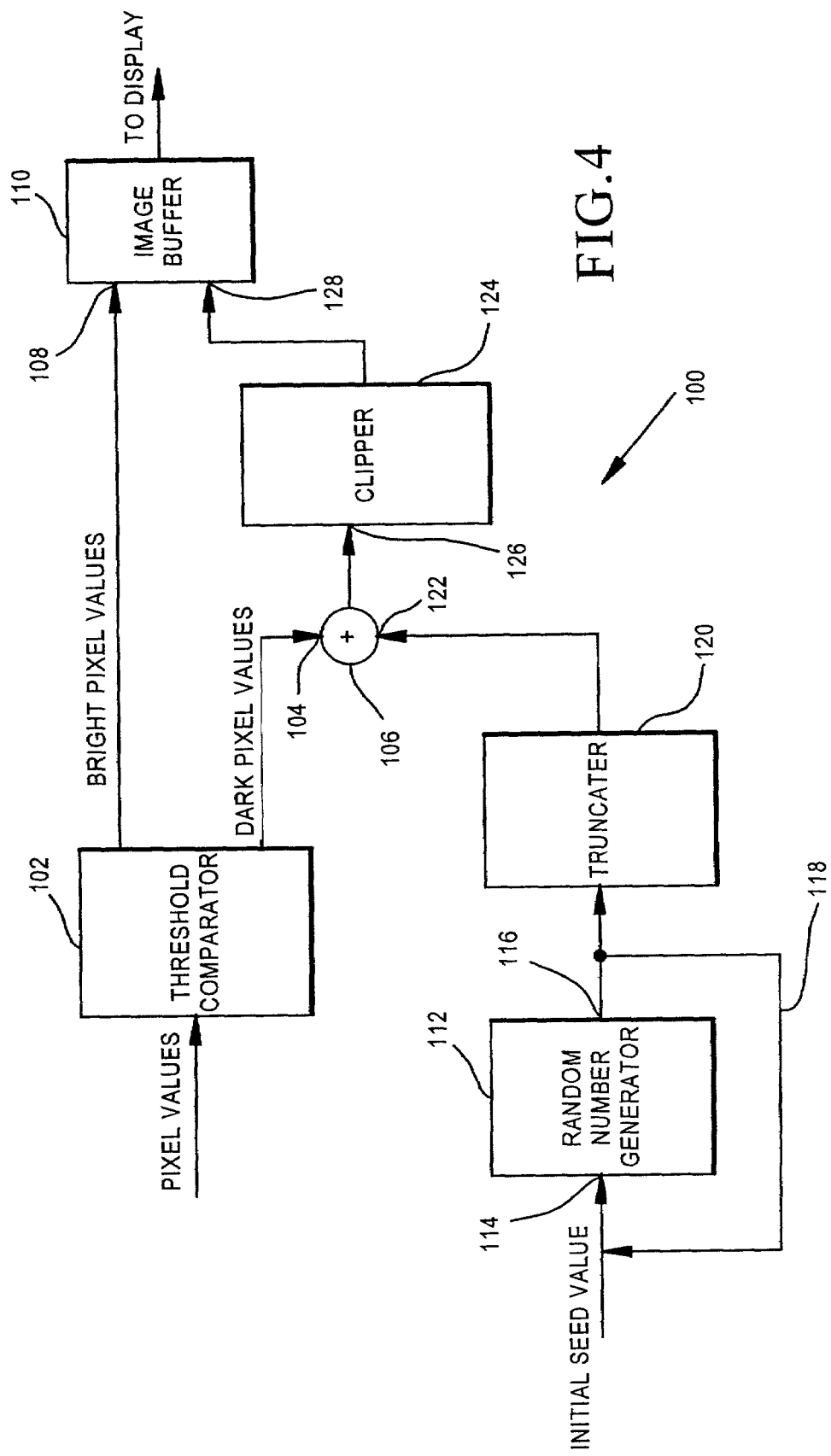
FIG. 4 is a block diagram of a pixel circuit according to an embodiment of the invention.

FIG. 4 is a block diagram of a pixel circuit 100 according to an embodiment of the invention. The pixel circuit 100 modifies pixel values in a decoded electronic image to reduce the visibility of artifacts such as contour artifacts. Specifically, the human eye is more sensitive to patterned noise such as quantization (discussed above in conjunction with FIGS. 1 and 2) than it is to random noise. Because quantization causes contour artifacts, the pixel circuit 100 introduces random noise into an image to make contour artifacts less visible or invisible to the human eye. Because, as stated above, contour artifacts are more noticeable in dark image regions than in bright image regions, the described embodiment of the circuit 100 introduces random noise into only the dark image regions to reduce the processing time. In other embodiments, however, the circuit 100 may introduce random noise into the bright regions as well.

The circuit 100 includes a threshold comparator circuit 102, which compares the pixel values (both chrominance and luminance values) of each pixel in an image to a respective threshold value. The circuit 102 provides the pixel values that are below the threshold value (the dark pixel values) to a first input terminal 104 of a combiner 106, which is a summer in one embodiment, and provides the pixel values that are above the threshold value (the bright pixel values) to a first input terminal 108 of an image buffer 110. A random-number generator 112 has input and output terminals 114 and 116, respectively, and generates a respective random number for each pixel location in the image whose pixel values the circuit 102 is processing. In one embodiment, the output terminal 116 is connected to the input terminal 114 to form a feedback loop. An optional truncator circuit 120 truncates the random number to a desired size. The truncator 120 (or the random-number generator 112 if the truncator 120 is omitted) provides the random numbers to a second input 122 of the combiner 106. Thus, for each pixel location, the generator 112 provides a respective random number to the combiner 106, which combines the random number with a respective dark pixel value to generate a modified dark pixel value. If a pixel location has a bright pixel value instead of a dark pixel value, then the generator 112 may still generate a random number for the pixel location even though the combiner 106 does not use the random number to modify a pixel value.

A clipper circuit 124 receives the modified dark pixel value from the combiner 106 on an input terminal 126, and determines whether the modified pixel value falls outside of a predetermined range of pixel values. If the modified pixel value does fall outside of the range, then the clipper circuit 124 "clips" the modified pixel value so that it falls within the range, thus preventing register overflow from generating erroneous modified pixel values. If the modified pixel value does not fall outside of the range, then the clipper circuit 124 does not alter the modified pixel value. The circuit 124 provides the clipped and unclipped modified pixel values to a second input 128 of the image buffer 110, which stores the bright pixel values and the modified dark pixel values in the proper order for display on a display device (not shown).

Figure 5:
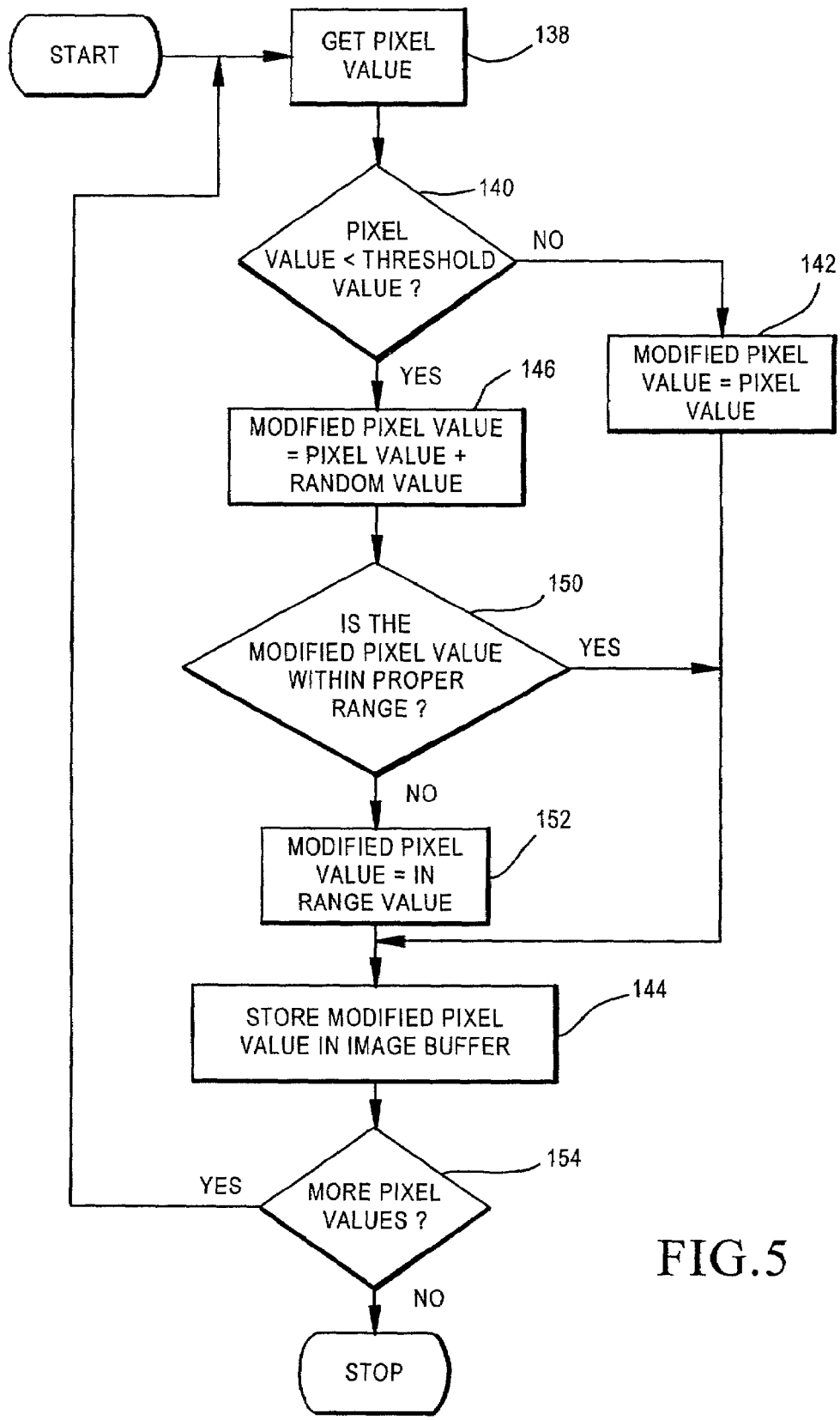
FIG. 5 is a flow diagram of the operation of the pixel circuit of FIG. 4 according to an embodiment of the invention.

Referring to FIG. 4 and the flow diagram of FIG. 5, the operation of the pixel circuit 100 according to an embodiment of the invention is discussed.

Referring to block 138 of FIG. 5, the threshold comparator 102 receives a pixel value, which can be a pixel luminance value or a pixel chrominance value. In one embodiment, the pixel values are 8 bits, and thus range from 0–255. Furthermore, the comparator 102 can receive the pixel values in any order. For example, the comparator 102 can receive and process all the luminance pixel values of an image and then process all the chrominance values of the image. Or, the comparator 102 can receive and process all pixel values (luminance and chrominance) for a first pixel location, then all pixel values for a second pixel location, and so on.

Next, referring to block 140, the comparator 102 determines whether the pixel value is less than the respective threshold value. In one embodiment, the circuit 102 compares all the luminance pixel values to a luminance threshold value and all of the chrominance pixel values to a chrominance threshold value. In another embodiment, the circuit 102 compares luminance and chrominance pixel values to the same threshold value. In yet another embodiment, the comparator 102 uses a different threshold value for each pixel location. Furthermore, although the threshold value may be any number, in one embodiment it is within a range of 50–80. In addition, although described as determining whether the pixel value is less than the threshold value, the circuit 102 may be constructed to determine whether the pixel value is less than or equal to, greater than, or greater than or equal to the threshold value depending on the type of artifact being reduced.

Referring to block 142, if the pixel value is not less than the threshold value, then the comparator 102 determines that the pixel value is a bright pixel value, and effectively generates a respective modified pixel value equal to the bright pixel value. (Although the modified pixel value merely equals the unmodified bright pixel value, it is called a modified pixel value for consistency within the flow diagram). Referring to block 144, the comparator 102 provides the modified pixel value to the input terminal 108 of the buffer 110 for storage therein.

If, however, the pixel value is less than the threshold value, then referring to block 146, the comparator 102 determines that the pixel value is a dark pixel value and the combiner 106 combines this dark pixel value with a random value from the generator 112 (and the optional truncator 120 if present) to generate a modified pixel value. In one embodiment, the combiner 106 sums the dark pixel value with the random value to generate the modified pixel value. The operation of the generator 112 is discussed in greater detail below.

Next, referring to block 150, the clipper circuit 124 determines whether the modified dark pixel value from the combiner 106 is within the proper range. If the modified pixel value is within range, then, referring to block 144, the circuit 124 passes the modified pixel value through to the input terminal 128 of the buffer 110 for storage therein. If, however, the modified pixel value is out of range, then, referring to block 152, the circuit 124 sets the modified pixel value to an in-range value before providing the modified pixel value to the buffer 110. For example, in one embodiment, if the proper pixel-value range is 0–255 and the modified pixel value is less than 0, then the circuit 124 sets the modified pixel value equal to 0. Likewise, if the modified pixel value is greater than 255, then the circuit 124 sets the modified pixel value equal to 255.

Referring to block 154, the pixel circuit 100 determines whether there are more pixel values to process. If not, then the pixel circuit 100 ends its routine until more pixel values are provided. If, however, there are more pixel values to process, then, referring to block 138, the threshold comparator receives the next pixel value and the process repeats the above-described steps starting at block 140.

Referring again to FIG. 4, the operation of the random-number generator 112 according to an embodiment of the invention is discussed. The generator 112 generates random numbers according to a random-number equation, which in one embodiment is:

$$\text{random number} = (1664525 \times \text{seed} + 1013904223) \bmod 2^{32} \quad (1)$$

Although the generator 112 may generate a different random number for each pixel value, in one embodiment, the generator 112 generates a different random number for each pixel location within an image. Thus, in such an embodiment, each random number is used to modify all dark pixel values (luminance and chrominance) for a respective pixel location. To generate these different random numbers, one provides a different seed number for each pixel location. In one embodiment, one provides an initial seed number to the input terminal 114 to generate a first random number for a first image. This first random number then feeds back to the input terminal 114 via a feedback path 118, and thus acts as the seed number to generate the next random number. This feedback continues until a random number is generated for each pixel location in the image. Such feedback reduces the processing time and power as compared to providing a new non-feedback seed value on the input terminal 114 for each random number. To generate the first random number for the next image, one may provide a new initial seed value or feed back the last random number generated for the previous image.

Because the random numbers generated by the random-number generator 112 are rather large, the optional truncater 120 may be included in the circuit 100 to reduce the random numbers to a desired size before providing them to the combiner 106. For example, in one embodiment, the truncater 120 reduces all of the random numbers to three bits (two magnitude and one sign) such that the truncated random numbers have one of the following values: −3, −2, −1, 0, 1, 2, 3.

Figure 6:
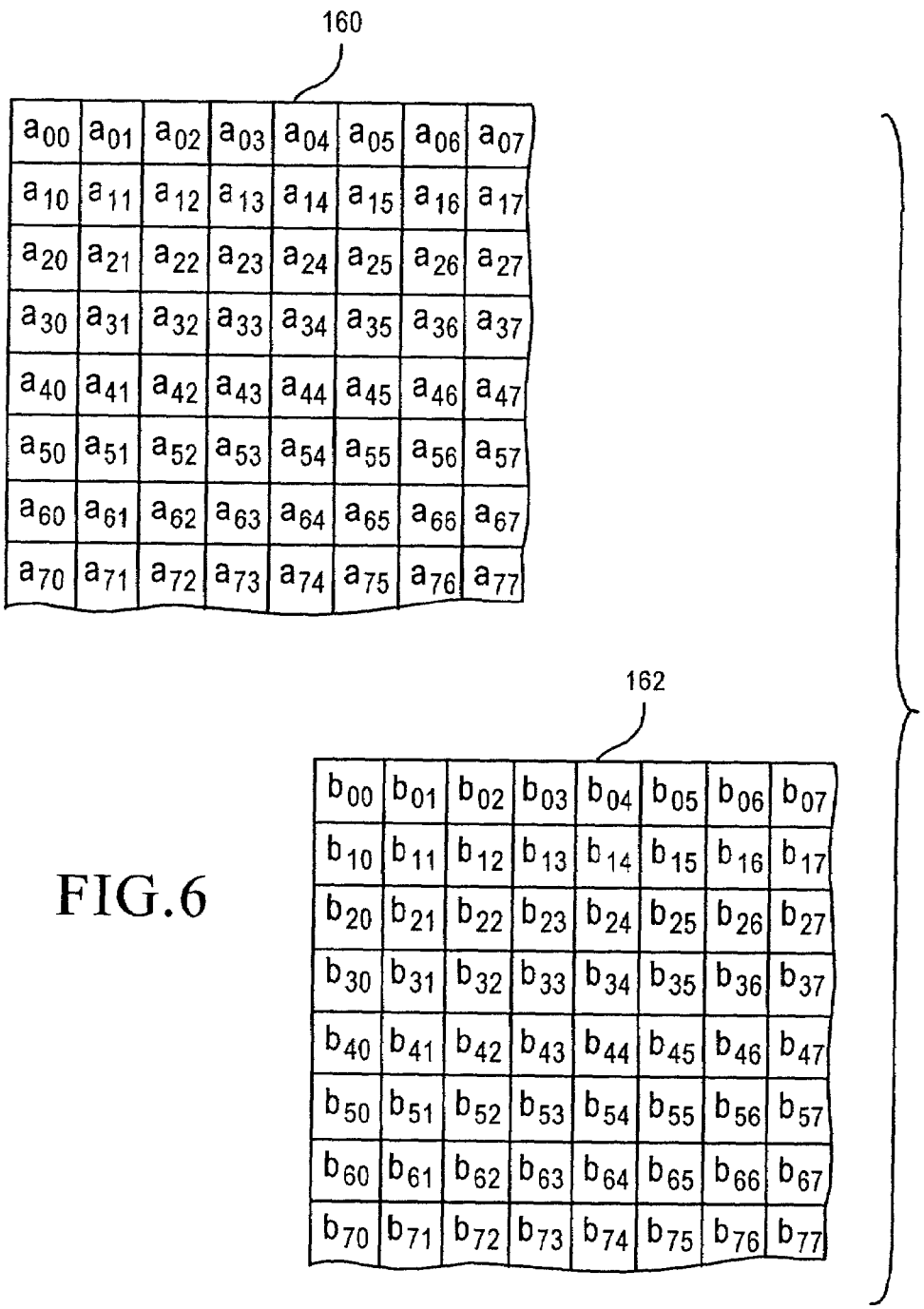
FIG. 6 is a diagram of respective portions of two sequential video frames that the pixel circuit of FIG. 4 can process according to an embodiment of the invention.

Referring to FIGS. 4 and 6, the operation of the random-number generator 112 is discussed for generation of both temporally variant random noise and temporally invariant random noise. FIG. 6 is a pixel diagram of two video frames 160 and 162 from the same sequence of video frames. To allow the pixel circuit 100 to process video frames using temporally variant random noise, the generator 112 generates different random numbers for the same respective pixel locations in different video frames. For example, the generator 112 generates different random numbers for pixel locations $a_{00}$ and $b_{00}$, different random numbers for pixel locations $a_{01}$ and $b_{01}$, and so on. Thus, the random noise pattern varies from frame to frame. Because the frames represent a scene at different times, the random noise pattern varies with time, and thus is temporally variant. Conversely, to allow the pixel circuit 100 to process video frames using temporally invariant random noise, the generator 112 generates the same random numbers for the same respective pixel locations in different video frames. For example, the generator 112 generates the same random number for the pixel locations $a_{00}$ and $b_{00}$, the same random number for the pixel locations $a_{01}$ and $b_{01}$, and so on. Thus, because the random noise pattern is the same from frame to frame, it does not vary with time. Although processing a sequence of video images with temporally invariant random noise yields a visually different result than processing the sequence of video images with temporally variant random noise, both techniques typically provide similar levels of reduction in the visibility of contour artifacts.

In one embodiment, the random-number generator 112 generates temporally variant random noise by using the feedback technique described above and using a different initial seed value for each video frame. For example, suppose the pixel circuit 100 processes the frame 160 before the frame 162. The generator 112 uses a first initial seed value to generate the random number for the pixel location $a_{00}$, feeds back the $a_{00}$ random number as the seed value for the pixel location $a_{01}$, and so on. After the circuit 100 is finished processing the frame 160, the generator 112 uses a second initial seed value that is different than the first initial seed value to generate the random number for the pixel location $b_{00}$. The generator 112 feeds back the $b_{00}$ random number as the seed value for the location $b_{01}$, and so on. Because the generator 112 uses different initial seed values for the frames 160 and 162, the random number for $a_{00}$ does not equal the random number for $b_{00}$, the random number for $a_{01}$ does not equal the random number for $b_{01}$, and so on. Therefore, the random noise pattern for the frame 160 is different from the random noise pattern for the frame 162. This is typically true even if the optional truncater 120 causes some of the pixel locations in the frame 160 to have the same truncated random numbers as the respective pixel locations in the frame 162.

In another embodiment, the random-number generator 112 generates temporally invariant noise by using the feedback technique described above and using the same seed value for each video frame. For example, suppose the pixel circuit 100 processes the frame 160 before the frame 162. The generator 112 uses an initial seed value to generate the random number for the pixel location $a_{00}$, feeds back the $a_{00}$ random number as the seed value for the pixel location $a_{01}$, and so on. After the circuit 100 is finished processing the frame 160, the generator 112 uses the same initial seed value to generate the random number for the pixel location $b_{00}$. The generator 112 feeds back the $b_{00}$ random number as the seed value for the location $b_{01}$, and so on. Because the generator 112 uses the same initial seed value for the frames 160 and 162, the random number for $a_{00}$ equals the random number for $b_{00}$, the random number for a01 equals the random number for b01, and so on. Therefore, the random noise pattern for the frame 160 is the same as the random noise pattern for the frame 162.

From the foregoing it will be appreciated that, although specific embodiments of the invention have been described herein for purposes of illustration, various modifications may be made without deviating from the spirit and scope of the invention. For example, the pixel circuit 100 (FIG. 4) can modify all the pixel values, bright and dark, instead of only the dark pixel values. Furthermore, although the pixel circuit 100 is described using various functional circuit blocks, it may be implemented in software, hardware, or a combination of both. For example, the pixel circuit 100 may be a processor, or may be a part of a larger image processing circuit that is implemented with one or more processors. Processors that one can use to implement the circuit 100 include the Map1000 processor developed by Equator Technologies, the Pentium or Celeron processors developed by Intel, and the K-6 processors developed by Advanced Micro Devices (AMD).

The invention claimed is:

1. An image processing circuit comprising:
a pixel circuit operable to,
compare a pixel value to a threshold value;
modify the pixel value only if the pixel value has a predetermined relationship to the threshold value; and
modify the pixel value if the pixel value is less than the threshold value.

2. The image processing circuit of claim 1 wherein the pixel value comprises a luminance pixel value.

3. The image processing circuit of claim 1 wherein the pixel value comprises a chrominance pixel value.

4. The image processing circuit of claim 1 wherein the threshold value is within a range of approximately 50–80.

5. The image processing circuit of claim 1 wherein the pixel circuit comprises a processor.

6. The image processing circuit of claim 1 wherein the pixel circuit is operable to modify the pixel value by adding a compensation value to the pixel value.

7. The image processing circuit of claim 6 wherein the compensation value comprises a randomly generated value.

8. The image processing circuit of claim 6 wherein the compensation value comprises a randomly generated value within a range of(-3) to (+3).

9. The image processing circuit of claim 6 wherein the pixel circuit is further operable to:
determine whether the sum of the pixel and compensation value is within a predetermined range of pixel values; and
set the sum equal to a value within the range if the sum is outside of the range.

10. An image processing circuit comprising:
a pixel circuit is operable to
generate a random number;
combine the random number with a pixel value; and
truncate the random number before combining the random number with the pixel value.

11. The image processing circuit of claim 10 wherein the pixel circuit is operable to add the random number to the pixel value.

12. The image processing circuit comprising:
a pixel circuit is operable to
generate a random number;
combine the random number with a pixel value; and
clip the pixel value if the pixel value is outside of a predetermined range.

13. An image processing circuit, comprising:
a pixel circuit operable to,
compare a first pixel value to a first threshold value, the first pixel value corresponding to a pixel location in a first video frame,
add a first compensation value to the first pixel value if the first pixel value is
less than the first threshold value,
compare a second pixel value to a second threshold value, the second pixel value corresponding to the pixel location in a second video frame, and
add a second compensation value to the second pixel value if the second pixel value is less than the second threshold value.

14. The image processing circuit of claim 13 wherein the first and second pixel values comprise respective luminance pixel values.

15. The image processing circuit of claim 13 wherein the first and second pixel values comprises respective chrominance pixel values.

16. The image processing circuit of claim 13 wherein the first and second threshold values are within a range of approximately 50–80.

17. The image processing circuit of claim 13 wherein the first threshold value equals the second threshold value.

18. The image processing circuit of claim 13 wherein the first and second compensation values comprise respective randomly generated numbers.

19. The image processing circuit of claim 13 wherein the first compensation value equals the second compensation value.

20. The image processing circuit of claim 13 wherein the first and second compensation values comprise respective randomly generated numbers within a range of(-3) to (+3).

21. The image processing circuit of claim 13 wherein the pixel circuit is further operable to:
determine if a first sum of the first pixel and first compensation values is less than zero;
determine if a second sum of the second pixel and second compensation values is less than zero; and
set the first sum equal to zero if the first sum is less than zero and set the second sum equal to zero if the second sum is less than zero.

22. An image processing circuit, comprising:
a pixel circuit operable to,
generate a first random number using a first seed number,
compare a first pixel value to a first threshold value,
add the first random number to the first pixel value if the first pixel value is less than the first threshold value,
generate a second random number using a second seed number,
compare a second pixel value to a second threshold,
add the second random number to the second pixel value if the second pixel value is less than the second threshold value.

23. The image processing circuit of claim 22 wherein the pixel circuit is operable to:
truncate the first random number before adding the first random number to the first pixel value; and truncate the second random number before adding the second random number to the second pixel value.

24. The image processing circuit of claim 22 wherein the second seed number equals the first random number.

25. The image processing circuit of claim 22 wherein the second seed number equals the first seed number.

26. The image processing circuit of claim 22 wherein:
the first pixel value corresponds to a first pixel location in an image; and
the second pixel value corresponds to a second pixel location in the image, the second pixel location contiguous with the first pixel location.

27. An image processing circuit, comprising
a pixel circuit operable to,
  generate a first random number using a first seed number,
  compare a first pixel value to a first threshold value,
  add the first random number to the first pixel value if the first pixel value is less than the first threshold value,
  truncate the first random number before adding the first random number to the first pixel value;
  generate a second random number using a second seed number,
  compare a second pixel value to a second threshold value,
  add the second random number to the second pixel value if the second pixel value is less than the second threshold value,
  truncate the second random number before adding the second random number to the second pixel value; and
  set the second seed number equal to the untruncated first random number.

28. An image processing circuit, comprising
a pixel circuit operable to,
  generate a first random number using a first seed number,
  compare a first pixel value to a first threshold value,
  add the first random number to the first pixel value if the first pixel value is less than the first threshold value,
  generate a second random number using a second seed number,
  compare a second pixel value to a second threshold value, and
  add the second random number to the second pixel value if the second pixel value is less than the second threshold value, wherein the pixel circuit is operable to generate the first and second random numbers using the following equation:

random number=(1664525 ×seed number+ 1013904223)mod $2^{32}$.

29. An image processing circuit, comprising:
a pixel circuit operable to,
  generate a first random number using a first seed number,
  compare a first pixel value to a first threshold value, the first pixel value corresponding to a starting pixel location in a first video frame value
  add the first random number to the first pixel value if the first pixel value is less than the first threshold value,
  generate a second random number using a second seed number,
  compare a second pixel value to a second threshold value, the second pixel corresponding to a starting pixel location in a second video frame, and
  add the second random number to the second pixel value if the second pixel value is less than the second threshold value.

30. The image processing circuit of claim 29 wherein the second seed number equals the first seed number.

31. The image processing circuit of claim 29 wherein the circuit is further operable to:
  generate a third random number using a third seed number;
  compare a third pixel value to a third threshold value, the third pixel value corresponding to an ending pixel location in the first video frame;
  add the third random number to the third pixel value if the third pixel value is less than the third threshold value; and
  set the second seed number equal to the third random number.

32. An image processing circuit comprising:
a pixel circuit is operable to
  generate a first random number,
  add the first random number to a first pixel value,
  generate a second random number,
  add the second random number to a second pixel value, and
  generate the first and second random numbers from respective first and second seed numbers.

33. An image processing circuit comprising:
a pixel circuit is operable to
  generate a first random number,
  add the first random number to a first pixel value,
  generate a second random number.
  add the second random number to a second pixel value,
  generate the first random number from a seed number; and
  generate the second random number from the first random number.

34. An image processing circuit comprising:
a pixel circuit operable to,
  generate a first random number,
  add the first random number to a first pixel value,
  generate a second random number, and
  add the second random number to a second pixel value, wherein:
  the first pixel value corresponds to a pixel location in a first video frame;
  the second pixel value corresponds to the pixel location in a second video frame; and
  the first random number equals the second random number.

35. An image processing circuit comprising:
a pixel circuit operable to,
  generate a first random number,
  add the first random number to a first pixel value,
  generate a second random number, and
  add the second random number to a second pixel value, wherein:
  the first pixel value corresponds to a starting pixel location in a first video frame;
  the second pixel value corresponds to the pixel location in a second video frame; and
  the first random number does not equal the second random number.

36. A circuit, comprising:
a comparator having a pixel-value input terminal and first and second pixel-value output terminals;
a random-number generator having a seed input terminal and a random-number output terminal;
a combiner having a first input terminal coupled to the first pixel-value output terminal;
a second input terminal coupled to the random-number output terminal, and a combiner output terminal; and
an image buffer having a first input terminal coupled to the second pixel-value output terminal and having a second input terminal coupled to the combiner output terminal.

37. The circuit of claim 36 wherein the comparator is operable to receive a pixel value on the pixel-value input terminal, provide the pixel value on the first pixel-value output terminal if the pixel value is less than a threshold value, and provide the pixel value on the second pixel-value output terminal if the pixel value is greater than the threshold value.

38. The circuit of claim 36 wherein the random-number output terminal is coupled to the seed input terminal.

39. The circuit of claim 36 wherein the combiner comprises a summer.

40. The circuit of claim 36, further comprising a random-number truncator disposed between the random-number generator and the combiner, the truncator having an input terminal coupled to the random-number output terminal of the random-number generator and having an output terminal coupled to the second input terminal of the combiner.

41. The circuit of claim 36, further comprising a clipper disposed between the combiner and the image buffer, the clipper having an input terminal coupled to the combiner output terminal and having an output terminal coupled to the second input terminal of the image buffer.

42. A method comprising:
comparing a pixel value to a threshold value;
modifying the pixel value only if the pixel value has a predetermined relationship to the threshold value;
generating a random number; and
setting the compensation value equal to the random number;
wherein the modifying comprises adding a compensation value to the pixel value.

43. A method comprising:
comparing a pixel value to a threshold value;
modifying the pixel value only if the pixel value has a predetermined relationship to the threshold value;
generating a random number;
truncating the random number to a number within a range of (−3) to (+3); and
setting the compensation value equal to the truncated random number;
wherein the modifying comprises adding a compensation value to the pixel value.

44. A method comprising:
comparing a pixel value to a threshold value;
modifying the pixel value only if the pixel value has a predetermined relationship to the threshold value;
determining whether the sum of the pixel and compensation value is within a predetermined range of pixel values; and
setting the sum equal to a value within the range if the sum is outside of the range:
wherein the modifying comprises adding a compensation value to the pixel value.

45. A method comprising:
comparing a pixel value to a threshold value; and
modifying the pixel value only if the pixel value has a predetermined relationship to the threshold value;
wherein the modifying comprises modifying the pixel value if the pixel value is less than the threshold.

46. A method comprising:
generating a random number;
combining the random number with a pixel value; and
truncating the random number before combining the random number with the pixel value.

47. A method comprising:
generating a random number;
combining the random number with a pixel value; and
clipping the pixel value if the pixel value is outside of predetermined range.

48. A method, comprising:
comparing a first pixel value to a first threshold value, the first pixel value corresponding to a pixel location in a first video frame;
adding a first compensation value to the first pixel value if the first pixel value is less than the first threshold value;
comparing a second pixel value to a second threshold value, the second pixel value corresponding to the pixel location in a second video frame; and
adding a second compensation value to the second pixel value if the second pixel value is less than the second threshold value.

49. The method of claim 48 wherein the first threshold value equals the second threshold value.

50. The method of claim 48 wherein the first and second compensation values equal the same randomly generated number.

51. The method of claim 48, further comprising:
determining if a first sum of the first pixel and first compensation values is less than zero;
setting the first sum equal to zero if the first sum is less than zero;
determining if a second sum of the second pixel and second compensation values is less than zero; and
setting the second sum equal to zero if the second sum is less than zero.

52. A method, comprising:
generating a first random number using a first seed number;
comparing a first pixel value to a first threshold value;
adding the first random number to the first pixel value if the first pixel value is less than the first threshold value;
generating a second random number using a second seed number;
comparing a second pixel value to a second threshold value; and
adding the second random number to the pixel value if the second pixel value is less than the second threshold value.

53. The method of claim 52 wherein:
the generating the first random number comprises truncating the first random number; and
the generating the second random number comprises truncating the second random number.

54. The method of claim 52 wherein the second seed number equals the first random number.

55. The method of claim 52 wherein the second seed number equals the first seed number.

56. A method, comprising:

generating a first random number using a first seed number;

comparing a first pixel value to a first threshold value;

adding the first random number to the first pixel value if the first pixel value is less than the first threshold value;

generating a second random number using a second seed number;

comparing a second pixel value to a second threshold value; and adding the second random number to the second pixel value if the second pixel value is less than the second threshold value, wherein the first and second random numbers are generated according to the following equation:

random number=(1664525 ×seed number+ 1013904223)mod $2^{32}$.

57. A method, comprising:

generating a first random number using a first seed number;

comparing a first pixel value to a first threshold value, the first pixel value corresponding to a starting pixel location in a first video frame;

adding a first random number to the first pixel value if the first pixel value is less than the first threshold value;

generating a second random number using second seed number;

comparing a second pixel value to a second threshold value, the second pixel value corresponding to a starting pixel location in a second video frame; and adding the second random number to the second pixel value if the second pixel value is less than the second threshold value.

58. The method of claim 57, further comprising setting the second seed number equal to the first seed number.

59. The method of claim 57, further comprising:

generating a third random number using a third seed number;

comparing a third pixel value to a third threshold value, the third pixel value corresponding to an ending pixel location in the first video frame;

adding the third random number to the third pixel value if the third pixel value is less than the third threshold value; and setting the second seed number equal to the third random number.

60. A method comprising:

generating a first random number;

adding the first random number to a first pixel value;

generating a second random number; and adding the second random number to a second pixel value;

wherein the generating the first and second random numbers comprises generating the first and second random numbers from respective first and second seed numbers.

61. A method comprising:

generating a first random number;

adding the first random number to a first pixel value;

generating a second random number; and adding the second random number to a second pixel value;

wherein:

the generating the first random number comprises generating the first random number from a seed number; and the generating the second random number comprises generating the second random number from the first random number.

62. A method comprising:

generating a first random number;

adding the first random number to a first pixel value;

generating a second random number; and adding the second random number to a second pixel value;

wherein:

the first pixel value corresponds to a pixel location in a first video frame;

the second pixel value corresponds to the pixel location in a second video frame; and the generating the second random number comprises generating the second random equal to the first random number.

63. A method comprising:

generating a first random number;

adding the first random number to a first pixel value;

generating a second random number; and adding the second random number to a second pixel value;

wherein:

the first pixel value corresponds to a starting pixel location in a first video frame;

the second pixel value corresponds to the pixel location in a second video frame; and the generating the second random number comprises generating the second random number unequal to the first random number.

* * * * *